United States Patent
Sumida et al.

(10) Patent No.: US 12,040,106 B2
(45) Date of Patent: Jul. 16, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Shintaro Sumida, Mie (JP); Motohiro Yokoi, Mie (JP); Kenta Ito, Mie (JP); Suguru Yasuda, Mie (JP); Tetsuya Nishimura, Mie (JP); Hitomi Harada, Mie (JP); Haruka Nakano, Mie (JP); Ryusuke Kudo, Mie (JP); Hiroki Hirai, Mie (JP); Housei Mizuno, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 296 days.

(21) Appl. No.: 17/611,402

(22) PCT Filed: May 12, 2020

(86) PCT No.: PCT/JP2020/018966
§ 371 (c)(1),
(2) Date: Nov. 15, 2021

(87) PCT Pub. No.: WO2020/241244
PCT Pub. Date: Dec. 3, 2020

(65) Prior Publication Data
US 2022/0199288 A1    Jun. 23, 2022

(30) Foreign Application Priority Data
May 31, 2019   (JP) ................. 2019-102424

(51) Int. Cl.
H01B 7/08 (2006.01)
H01B 7/02 (2006.01)
H01B 7/40 (2006.01)

(52) U.S. Cl.
CPC ......... H01B 7/0838 (2013.01); H01B 7/0225 (2013.01); H01B 7/40 (2013.01)

(58) Field of Classification Search
CPC ...... H01B 7/0838; H01B 7/40; H01B 7/0225; H02G 3/04
See application file for complete search history.

(56) References Cited

U.S. PATENT DOCUMENTS 3,663,739 A * 5/1972 Chevrier .................. H01B 7/08
174/32
10,867,721 B2   12/2020 Ishida et al.
(Continued)

FOREIGN PATENT DOCUMENTS

CN   1152678   6/1997
JP   6-27086 U   4/1994
(Continued)

OTHER PUBLICATIONS

International Search Report issued in International Patent Application No. PCT/JP2020/018966, dated Jun. 23, 2020, along with an English translation thereof.
(Continued)

*Primary Examiner* — Timothy J Thompson
*Assistant Examiner* — John B Freal
(74) *Attorney, Agent, or Firm* — GREENBLUM & BERNSTEIN, P.L.C.

(57) ABSTRACT

A wiring member includes: a plurality of wire-like transmission members; a sheet to which the plurality of wire-like transmission members are fixed to be arranged side by side; and a level difference absorption member provided on an
(Continued)

outer side of the sheet, wherein the sheet includes a first sheet covering the plurality of wire-like transmission members from one side and a second sheet covering the plurality of wire-like transmission members from another side, the level difference absorption member is provided on an outer side of the second sheet, and the level difference absorption member is provided to be able to absorb a level difference caused by a level difference formed on an outer surface of the second sheet when an outer surface side of the level difference absorption member is vacuum-sucked.

7 Claims, 4 Drawing Sheets

(56) References Cited

U.S. PATENT DOCUMENTS

| | | | |
|---|---|---|---|
| 2006/0011375 | A1 | 1/2006 | Sugimoto et al. |
| 2007/0149021 | A1 | 6/2007 | Mikami et al. |
| 2022/0076862 | A1* | 3/2022 | Nakano .................... H01B 7/40 |

FOREIGN PATENT DOCUMENTS

| | | |
|---|---|---|
| JP | 2002-56722 | 2/2002 |
| JP | 2002-218634 | 8/2002 |
| JP | 2006-019055 | 1/2006 |
| JP | 2007-173056 | 7/2007 |
| JP | 3134886 U | 8/2007 |
| JP | 2015-016721 | 1/2015 |
| JP | 2018-17771 | 2/2018 |
| JP | 2018-137208 | 8/2018 |
| KR | 2001-0010855 | 2/2001 |
| KR | 10-2008-0103891 | 11/2008 |
| KR | 10-2013-0040410 | 4/2013 |

OTHER PUBLICATIONS

China Office Action issued in China Patent Application No. 202080038343.0, dated Sep. 25, 2023, together with an English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that a flat wiring member such as a wire harness described in Patent Document 1 is held by a vacuum suction and transported.

Thus, an object is to provide a wiring member which can be easily held by a vacuum suction.

Means to Solve the Problem

A wiring member according to the present disclosure includes: a plurality of wire-like transmission members; a sheet to which the plurality of wire-like transmission members are fixed to be arranged side by side; and a level difference absorption member provided on an outer side of the sheet, wherein the sheet includes a first sheet covering the plurality of wire-like transmission members from one side and a second sheet covering the plurality of wire-like transmission members from another side, the level difference absorption member is provided on an outer side of the second sheet, and the level difference absorption member is provided to be able to absorb a level difference caused by a level difference formed in an outer surface of the second sheet when an outer surface side of the level difference absorption member is vacuum-sucked.

Effects of the Invention

According to the present disclosure, the wiring member is easily held by suction.

DESCRIPTION OF EMBODIMENT(S)

Description of Embodiment of Present Disclosure

Figure 1:
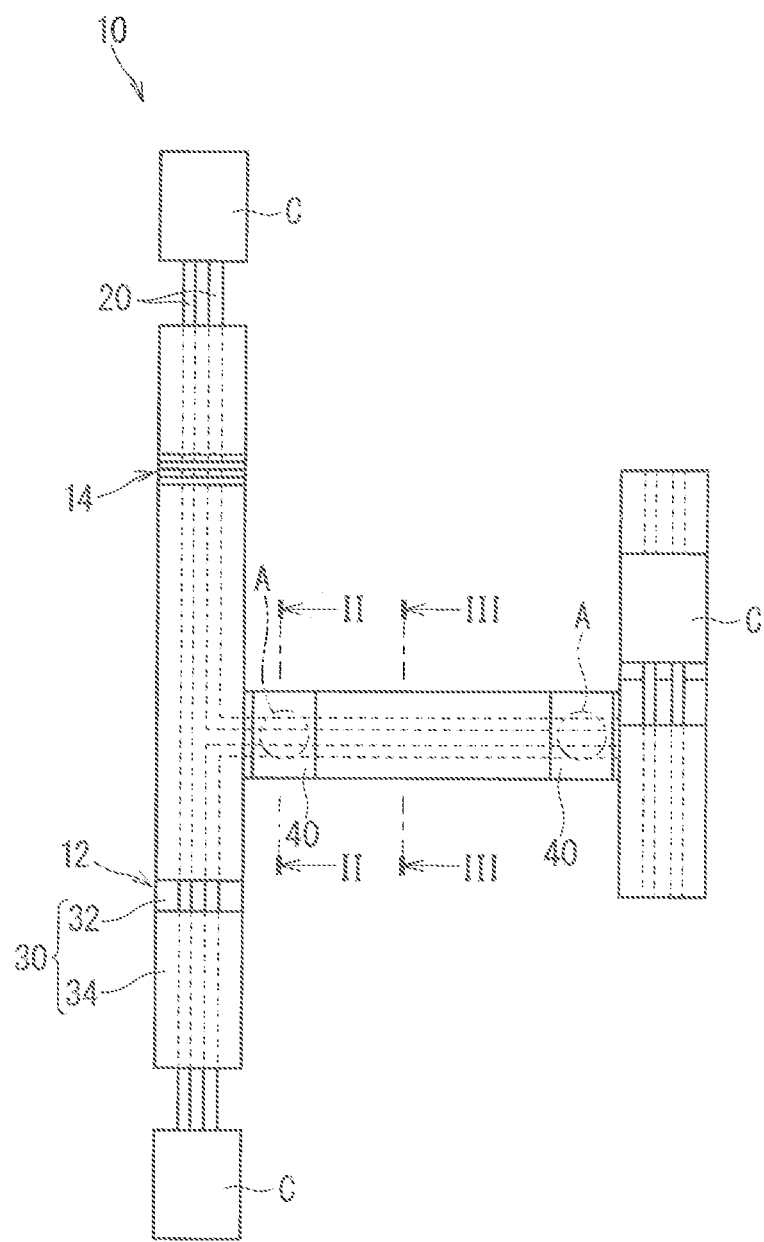
FIG. 1 is a plan view illustrating a wiring member according to an embodiment 1.

Embodiments of the present disclosure are listed and described firstly.

A wiring member according to the present disclosure is as follows.

(1) A wiring member includes: a plurality of wire-like transmission members; a sheet to which the plurality of transmission members are fixed to be arranged side by side; and a level difference absorption member provided on an outer side of the sheet, wherein the sheet includes a first sheet covering the plurality of wire-like transmission members from one side and a second sheet covering the plurality of wire-like transmission members from another side, the level difference absorption member is provided on an outer side of the second sheet, and the level difference absorption member is provided to be able to absorb a level difference caused by a level difference formed in an outer surface of the second sheet when an outer surface side of the level difference absorption member is vacuum-sucked. Accordingly, when the outer surface of the level difference absorption member is vacuum-sucked, the outer surface of the level difference absorption member and a vacuum suction pad are firmly attached to each other in an airtight state easily. Accordingly, an air leakage is suppressed at a time of the vacuum suction, thus the wiring member is easily held by the vacuum suction.

(2) It is applicable that the level difference absorption member is easily deformed in a thickness direction, and an outer surface of the level difference absorption member is deformed into a shape corresponding to a vacuum suction pad when the level difference absorption member is pressed by the vacuum suction pad. Accordingly, the outer surface of the level difference absorption member and the vacuum suction pad are firmly attached to each other in an airtight state easily before vacuuming is started.

(3) The level difference absorption member may have a thickness dimension equal to or larger than the level difference formed in the outer surface of the second sheet. Accordingly, the level difference absorption member completely absorbs the level difference easily.

(4) It is applicable that the level difference absorption member includes a fixing part fixed to the second sheet and a deformation piece formed to be continuous to the fixing part and not fixed to the second sheet, and when a vacuum suction starts in a state where a vacuum suction pad has contact with the fixing part and there is a gap between the vacuum suction pad and the deformation piece, the deformation piece is deformed to get close to the vacuum suction pad. Accordingly, the outer surface of the level difference absorption member and the vacuum suction pad are firmly attached to each other in an airtight state easily after vacuum suction is started.

(5) A modulus of elasticity of the level difference absorption member may be smaller than a modulus of elasticity of the second sheet. Accordingly, the level difference absorption member is elastically deformed more easily than the second sheet.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
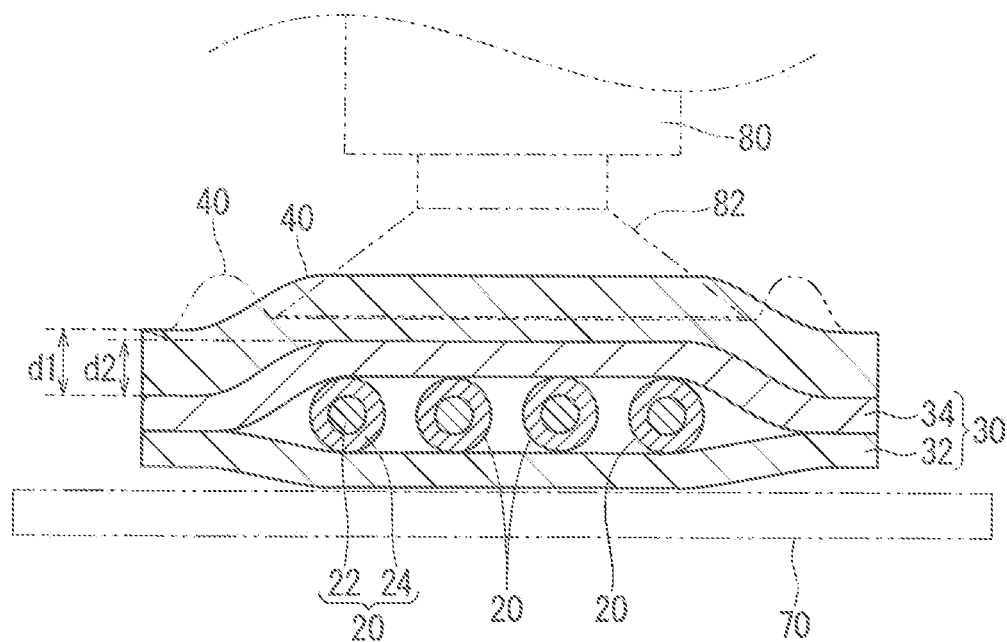
FIG. 2 is a cross-sectional view along a II-II line in FIG. 1.
Figure 3:
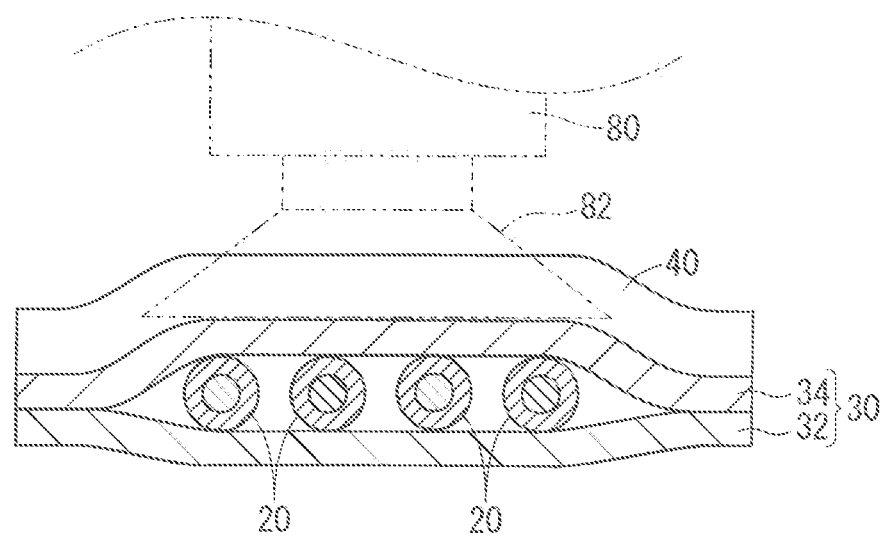
FIG. 3 is a cross-sectional view along a III-III line in FIG. 1.

A wiring member according to an embodiment 1 is described hereinafter. FIG. 1 is a plan view illustrating a wiring member 10 according to the embodiment 1. FIG. 2 is a cross-sectional view along a II-II line in FIG. 1. FIG. 3 is a cross-sectional view along a III-III line in FIG. 1. In FIG. 1, a terminal portion on a left side indicates a state before the wiring member 10 is folded, and a terminal portion on a right side indicates a state after the wiring member 10 is folded. When the terminal portion on the right side is developed, it will be the same as the terminal portion on the left side. When the terminal portion on the left side is folded, it will be the same as the terminal portion on the right side. The wiring member 10 is normally transported to an assembly operation position to be assembled to a vehicle in a folded state, developed in the assembly operation position, and assembled to the vehicle. In the description, at this time, the wiring member 10 is sucked by a vacuum suction pad 82 provided on a tip end of a robot arm 80, for example, and raised to be transported in a state of being folded and disposed on a table 70.

An example of performing a vacuum suction is described in the embodiment hereinafter, however, it is obvious that a suction configuration is not limited to the vacuum suction. It is sufficient that negative pressure large enough to suck and raise the wiring member 10 is applied.

The wiring member 10 is wholly formed into a flat state. The wiring member 10 includes a plurality of wire-like transmission members 20, a sheet 30, and a level difference absorption member 40.

It is sufficient that the wire-like transmission member 20 is a wire-like member transmitting an electrical power or light, for example. For example, the wire-like transmission member 20 may be a general wire having a core wire and a covering around the core wire, or may also be a bare conductive wire, a shielded wire, an enamel wire, a nichrome wire, or an optical fiber.

The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

The wire-like transmission member 20 includes a transmission wire body transmitting an electrical power or light and a covering for covering the transmission wire body. When the wire-like transmission member 20 is a general wire, the transmission wire body is a core wire 22, and the covering is an insulating covering 24. The core wire 22 may be made up of a plurality of single wires. The plurality of single wires may be stranded. In the example illustrated in FIG. 2, the plurality of wire-like transmission members 20 having the same diameter and structure are disposed on one sheet 30, however, it is sufficient that the diameter and the structure of each of the plurality of wire-like transmission members 20 are appropriately set, thus the wire-like transmission members 20 each having a different diameter and a structure, for example, may be disposed on the same sheet 30.

The wire-like transmission member 20 may be a single wire-like object or a composite object of a plurality of wire-like objects (a twisted wire and a cable made up of a plurality of wire-like objects covered by a sheath). A terminal and a connector C, for example, are appropriately provided in accordance with a connection state of the wire-like transmission member 20 and the other side member in an end portion of the wire-like transmission member 20.

In the example illustrated in FIG. 1, the plurality of wire-like transmission members 20 extend along a H-shaped route on the sheet 30. The wiring member 10 is thereby provided with two branch parts and four terminal portions. Needless to say, the route of the plurality of wire-like transmission members 20 is not limited thereto. It is sufficient that the plurality of wire-like transmission members 20 are wired in a state following a route in a vehicle on the sheet 30. The plurality of wire-like transmission members 20 are wired in the state of following the route in the vehicle on the sheet 30, thus the route of the plurality of wire-like transmission members 20 is regulated, and the plurality of wire-like transmission members 20 can be assembled to the vehicle easily. In the description hereinafter, in a part of the wiring member 10, a direction along a longitudinal direction of the wire-like transmission member 20 is simply referred to as a longitudinal direction, and a direction along a direction in which the plurality of wire-like transmission members 20 are arranged is simply referred to as a parallel direction.

The plurality of wire-like transmission members 20 are fixed to the sheet 30 to be arranged side by side. The sheet 30 keeps a wiring state of the wire-like transmission member 20. The sheet 30 includes a first sheet 32 and a second sheet 34. The first sheet 32 covers the plurality of wire-like transmission members 20 from one side. The second sheet 34 covers the plurality of wire-like transmission members 20 from the other side (a side opposite to the first sheet 32). An intermediate portion in the wire-like transmission member 20 is surrounded by the first sheet 32 and the second sheet 34. Accordingly, suppressed is an exposure of the intermediate portion in the wire-like transmission member 20. The sheet 30 is formed into a shape along a route of the plurality of wire-like transmission members 20. A band-like portion extends along the route of the plurality of wire-like transmission members 20 to form the sheet 30. A width dimension of the band-like portion is larger than an interval between the wire-like transmission member 20 on a side of one side portion along the parallel direction and the wire-like transmission member 20 on a side of the other side portion.

Herein, the wire-like transmission member 20 is fixed to only the first sheet 32 in the first sheet 32 and the second sheet 34. A fixing state of the wire-like transmission member 20 and the first sheet 32 is not particularly limited, however, bonding or welding may also be applied. The bonding indicates that two members are bonded to each other via an inclusion such as an adhesive agent or a double-sided adhesive tape. The welding indicates that resin contained in at least one of two members are melted and the two members are welded to each other without an intervention of an inclusion. Herein, at least one of resin contained in the insulating covering 24 of the wire-like transmission member 20 and resin contained in the first sheet 32 is melted and bonded to the other side member, thus the wire-like transmission member 20 and the first sheet 32 are fixed to each other.

Materials constituting the first sheet 32 and the second sheet 34 are not particularly limited, however, the first sheet 32 and second sheet 34 are formed of materials containing resin of polyvinyl chloride (PVC), polyethylene terephthalate (PET), polypropylene (PP), or nylon, for example. The first sheet 32 and the second sheet 34 may be a fibrous material having fiber such as a non-woven cloth, a woven fabric, or a knitting fabric or a non-fiber material, for example. The non-fiber material may be a solid member with an inner portion evenly filled or a foam made up by foam molded resin. The first sheet 32 and the second sheet 34 may contain a material such as metal, for example.

The first sheet 32 and the second sheet 34 may be a single layer or may be a plurality of stacked layers. When the first sheet 31 and the second sheet 32 are made up of the plurality of stacked layers, it is considered that a resin layer and a resin layer are stacked, for example. It is also considered that a resin layer and a metal layer are stacked, for example. The first sheet 32 and the second sheet 34 may be made up of a non-fiber material layer and a non-fiber material layer overlapped with each other, a non-fiber material layer and a fiber material layer overlapped with each other, or a fiber material layer and a fiber material layer overlapped with each other.

The first sheet 32 has a double-layered structure, for example. A first layer in the first sheet 32 is a layer appropriate for fixation to the wire-like transmission member 20. For example, the first layer is formed into a solid member, with an inner portion evenly filled, of the same material as that of the insulating covering 24 of the wire-like transmission member 20. The wire-like transmission member 20 is fixed on the first layer. The second layer is a layer enhancing a function of the sheet 30. The second layer is a non-woven cloth, for example. The first layer may be wholly or partially provided on the second layer. For example, the first layer may be provided only in an intermediate portion along a width direction of the second layer (a parallel direction of the wire-like transmission member 20), and needs not be provided in a side edge portion. For example, the first layer may be provided at intervals along the longitudinal direction of the second layer (the longitudinal direction of the wire-like transmission member 20). The first sheet 32 is easily bended. The first sheet 32 is soft enough to be able to follow bending of the wire-like transmission member 20 when the wiring member 10 is folded.

The second sheet 34 has a single-layered structure, for example. The second sheet 34 has higher rigidity than the first sheet 32. The second sheet 34 is a solid member of nylon as a material with an inner portion evenly filled, for example. The wire-like transmission member 20 is not fixed to the second sheet 34. An edge portion of the second sheet 34 is fixed to the first sheet 32. A fixing state of the first sheet 32 and the second sheet 34 is not particularly limited, however, welding or bonding is also applicable. The second sheet 34 may be fixed to the first layer or the second layer in the first sheet 32.

The wiring member 10 is provided with easy-bending parts 12 and 14. The easy-bending parts 12 and 14 are provided in a region where the sheet 30 is located. The easy-bending part 12 is a part where the second sheet 34 is provided at intervals along the longitudinal direction of the wire-like transmission member 20. That is to say, the easy-bending part 12 is a part where the second sheet 34 is not located along the longitudinal direction of the wire-like transmission member 20. The easy-bending part 14 is a part formed into a shape capable of partially bending the second sheet 34 easily. In the example illustrated in FIG. 1, an accordion-like part is formed as the shape capable of bending the second sheet 34 easily. The accordion-like part is a part formed into an accordion-like shape in which a mountain and a valley are alternately and sequentially located in the longitudinal direction of the wire-like transmission member 20. When a part on a terminal portion side is bended at positions of the easy-bending parts 12 and 14, the wiring member 10 is folded. One example of the easy-bending part is described above, however, it is sufficient that the easy-bending part has a shape of being partially bended easily such as a fold line (not shown), for example, thus the shape thereof is not particularly limited. Also applicable is a shape in which a slit (not shown) is provided not in the second sheet but in the first sheet to form the easy-bending part, for example.

The wiring member 10 is provided with a vacuum suction position. In the example illustrated in FIG. 1, a region A illustrated by a dashed-two dotted line is the vacuum suction position. In the example illustrated in FIG. 1, two vacuum suction positions are set. The vacuum suction position is set in a position where the wiring member 10 is hardly inclined when the wiring member 10 is vacuum-sucked at the position and raised and can substantially maintain balance. The number of vacuum suction positions in one wiring member 10 is not limited to two. For example, when the wiring member 10 is relatively small, one vacuum suction position may be provided. For example, when the wiring member 10 is relatively large, three or more vacuum suction positions may be provided.

A level difference occurs in an outer surface of the second sheet 34. The level difference may occur by fixing the first sheet 32 and the second sheet 34. The level difference may also occur by a difference in an outer diameter of the plurality of wire-like transmission members 20. Described herein is a level difference occurring by fixing the first sheet 32 and the second sheet 34, and described hereinafter is a level difference occurring by the difference in an outer diameter of the plurality of wire-like transmission members 20.

There is a curved surface curved in a thickness direction in the outer surface of the second sheet 34. The curved surface is a portion generated when the first sheet 32 and the second sheet 34 get close to each other from an intermediate portion covering the wire-like transmission member 20 toward an edge portion not covering the wire-like transmission member 20 in the fixation of the first sheet 32 and the second sheet 34. A level difference occurs when the curved surface is generated in the outer surface of the second sheet 34.

The level difference absorption member 40 is provided on an outer side of the sheet 30. The level difference absorption member 40 is provided on an outer side of the second sheet 34. A level difference is formed in an outer surface of the level difference absorption member 40. The level difference in the outer surface of the level difference absorption member 40 is a level difference caused by the level difference formed in the outer surface of the second sheet 34. That is to say, a part of the level difference absorption member 40 covering the curved surface of the second sheet 34 is provided to follow the curved surface of the second sheet 34. The level difference absorption member 40 is formed to have a uniform thickness. According to these configurations, the part of the level difference absorption member 40 covering the curved surface of the second sheet 34 is curved to follow the curved surface of the second sheet 34, and a curved surface is also formed in the outer surface of the level difference absorption member 40. A level difference is formed in the outer surface of the level difference absorption member 40 by this curved surface.

The level difference absorption member 40 is formed into a plate-like shape. A shape of the level difference absorption member 40 in a plan view is not particularly limited, however, polygonal shape or a circular shape is also applicable. A first main surface of the level difference absorption member 40 is directed to a side of the second sheet 34. At least a part of the first main surface of the level difference absorption member 40 is fixed to the second sheet 34. A second main surface of the level difference absorption member 40 is the outer surface of the level difference absorption member 40, and is an outer surface of the wiring member 10.

A dimension of the level difference absorption member 40 along the parallel direction is not particularly limited, however, any size is applicable as long as it can be compatible with the vacuum suction pad 82. In the example illustrated in FIG. 4, the dimension of the level difference absorption member 40 along the parallel direction is the same as that of the second sheet 34 along the parallel direction. The dimension of the level difference absorption member 40 along the parallel direction may be smaller or larger than that of the second sheet 34 along the parallel direction. When the dimension of the level difference absorption member 40 along the parallel direction is smaller than that of the second sheet 34 along the parallel direction, the dimension of the level difference absorption member 40 along the parallel direction may be the same as, larger than, or smaller than an interval between two wire-like transmission members 20 farthest away from each other along the parallel direction.

A thickness dimension of the level difference absorption member 40 needs not be uniform. The thickness dimension of the level difference absorption member 40 may be set to be changed in accordance with the level difference of the second sheet 34, for example. For example, when the second sheet 34 includes a level difference, a first portion and a second portion protruding more than the first portion in the thickness direction occur in the second sheet 34. For example, a thickness dimension of a part of the second sheet 34 corresponding to the first portion may be larger than a thickness dimension of a part of the second sheet 34 corresponding to the second portion in the level difference absorption member 40. Accordingly, a level difference is not formed in the outer surface of the level difference absorption member, or even when a level difference is formed, it is smaller than that of the second sheet. Accordingly, the air leakage at the time of vacuum suction is suppressed more easily.

Both end portions of the level difference absorption member 40 along the parallel direction do not protrude to an outer side than an outer edge of the second sheet 34. One end portion of the level difference absorption member 40 along the parallel direction may protrude to the outer side than the outer edge of the second sheet 34, or both end portions may protrude to the outer side than the outer edge of the second sheet 34.

It is sufficient that the level difference absorption member 40 and the second sheet 34 are fixed to each other in a part having contact with each other. A fixing state of the level difference absorption member 40 and the second sheet 34 is not particularly limited, however, bonding or welding may also be applied.

For example, the level difference absorption member 40 and the second sheet 34 may be wholly fixed to each other along the parallel direction. For example, the level difference absorption member 40 and the second sheet 34 may be fixed to each other only at an intermediate portion (a portion covering the wire-like transmission member 20) or an end portion along the parallel direction. For example, the level difference absorption member 40 and the second sheet 34 may be fixed to each other only at a portion protruding to an outermost side along the thickness direction.

When the level difference absorption member 40 and the second sheet 34 are fixed to each other only at the intermediate portion (the portion covering the wire-like transmission member 20) along the parallel direction, the end portion of the level difference absorption member 40 may hang down toward the second sheet 34 or extend straight from the intermediate portion.

A depression may be formed in a portion of the outer surface of the second sheet 34 where the level difference absorption member 40 is provided. A shape of the depression is not particularly limited as long as the depression can house the level difference absorption member 40, but may be also formed to have a groove-like shape extending along the parallel direction, for example. The level difference absorption member 40 is housed in the depression, thus the level difference absorption member 40 is positioned with respect to the second sheet 34. The level difference absorption member 40 and a bottom portion of the depression have contact with each other, thus a contact area between the level difference absorption member 40 and the second sheet 34 increases along the parallel direction compared with a case where the level difference absorption member 40 and a part of the outer surface of the second sheet 34 other than the depression have contact with each other. Even in the case where the level difference absorption member 40 is provided, an amount of increase in the thickness dimension of the wiring member 10 decreases in the portion where the level difference absorption member 40 is provided.

The level difference absorption member 40 is provided to be able to absorb the level difference when an outer surface side of the level difference absorption member 40 is vacuum-sucked. Herein, the level difference absorption member 40 is deformed to shrink in the thickness direction, thereby absorbing the level difference. It is obvious that a time when the outer surface side of the level difference absorption member 40 is vacuum-sucked is not limited to a time of vacuum suction, but also includes a time when the outer surface side is pressed by the vacuum suction pad 82 at the time of vacuum suction.

The level difference absorption member 40 is easily deformed in the thickness direction. When the level difference absorption member 40 is pressed by the vacuum suction pad 82, the outer surface of the level difference absorption member 40 is deformed into a shape corresponding to the vacuum suction pad 82. Herein, the level difference absorption member 40 is elastically deformed in the thickness direction easily. When the level difference absorption member 40 is pressed by the vacuum suction pad 82, the outer surface of the level difference absorption member 40 is elastically deformed into a shape corresponding to the vacuum suction pad 82. When the level difference absorption member is pressed by the vacuum suction pad 82, the outer surface of the level difference absorption member may be plastically deformed into a shape corresponding to the vacuum suction pad 82.

The level difference absorption member 40 is formed by an elastic material such as rubber or elastomer, for example. The level difference absorption member 40 may include a void inside such as foam resin or a non-woven cloth, thereby having elasticity. Various materials can be used for the level difference absorption member 40 as long as an air leakage can be suppressed at the time of vacuum suction as described above. It is sufficient that the level difference absorption member 40 is formed to have a modulus of elasticity smaller than at least the second sheet 34. It is sufficient that a material of the level difference absorption member 40 has a modulus of elasticity smaller than that of at least the second sheet 34. Accordingly, when the level difference absorption member 40 is pressed by the vacuum suction pad 82, the level difference absorption member 40 is easily deformed. The modulus of elasticity herein may be Young's modulus or bulk-modulus, however, it is sufficient to apply the bulk-modulus when the level difference absorption member 40 is deformed by being pressed by the vacuum suction pad 82, thereby absorbing the level difference.

It is sufficient that the outer surface of the level difference absorption member 40 has airtightness. Accordingly, an air leakage hardly occurs at the time of vacuum suction. For example, the level difference absorption member 40 may uniformly have low air permeability along the thickness direction. In this case, the level difference absorption member 40 may be formed to be evenly solid, or may also be formed so that voids are not connected to each other such as a closed pore foam resin, for example. The level difference absorption member 40 may have a multilayer structure of a layer not having airtightness and a layer having airtightness. In this case, the layer having airtightness may be a film formed to be evenly solid. It is sufficient that the layer not having airtightness is an elastically-deformable layer, and may also be a non-woven cloth or an open pore foam resin, for example.

The level difference absorption member 40 has a thickness dimension larger than the level difference formed in the outer surface of the second sheet 34. More specifically, a dimension d1 in FIG. 2 is the thickness dimension of the level difference absorption member 40. A dimension d2 in FIG. 2 is a dimension of the level difference formed in the outer surface of the second sheet 34. The dimension d1 is equal to or larger than the dimension d2. In this case, the outer surface of the level difference absorption member 40 protrudes to an outer side than a farthermost part of the outer surface of the second sheet 34 in any position. Needless to say, the level difference absorption member 40 may have a thickness dimension smaller than the level difference formed in the outer surface of the second sheet 34. In the example illustrated in FIG. 2, the level difference absorption member 40 has the thickness dimension larger than the second sheet 34, but may has the thickness dimension equal to or smaller than the second sheet 34.

<Operation Etc.>

When the vacuum suction pad 82 is applied to the level difference absorption member 40, the vacuum suction pad 82 firstly has contact with a part of the level difference absorption member 40 protruding to an outermost side along the thickness direction. When the vacuum suction pad 82 presses the level difference absorption member 40 in this state, the level difference absorption member 40 is elastically deformed to shrink in the thickness direction. Then, as illustrated by a dashed-two dotted line in FIG. 2, the level difference absorption member 40 is elastically deformed into a shape corresponding to the vacuum suction pad 82. Accordingly, the level difference absorption member 40 and the vacuum suction pad 82 are firmly attached to each other in an airtight state easily, and an air leakage (vacuum leakage) at the time of the vacuum suction is suppressed.

In the meanwhile, when the vacuum suction pad 82 is applied to a portion where the level difference absorption member 40 is not located, the vacuum suction pad 82 has contact with the outer surface of the second sheet 34 as illustrated in FIG. 3. At this time, the vacuum suction pad 82 may be applied to a level difference portion in the outer surface of the second sheet 34 and protrude from a planar surface in the parallel direction in some cases. In this case, the outer surface of the second sheet 34 and the vacuum suction pad 82 are hardly attached to each other in an airtight state, and an air leakage (vacuum leakage) at the time of the vacuum suction may occur in some cases.

Effect Etc. of Embodiment 1

According to the wiring member 10, when the outer surface of the level difference absorption member 40 is vacuum-sucked, the outer surface of the level difference absorption member 40 and a vacuum suction pad 82 are firmly attached to each other in an airtight state easily. Accordingly, the air leakage is suppressed at the time of the vacuum suction, thus the wiring member 10 is easily held by the vacuum suction. A state where the wiring member 10 is easily held by the vacuum suction indicates a state where the air leakage is suppressed, thus the wiring member 10 can be sucked with small suction strength (vacuum pressure).

When the level difference absorption member 40 is pressed by the vacuum suction pad 82, the outer surface of the level difference absorption member 40 is deformed into a shape corresponding to the vacuum suction pad 82, thus the outer surface of the level difference absorption member 40 and the vacuum suction pad 82 are firmly attached to each other in an airtight state easily before vacuuming is started. When the level difference absorption member 40 is elastically deformed at this time, the shape of the level difference absorption member 40 is restored after the vacuum suction is finished. Thus, this configuration can also be compatible with the vacuum suction of the wiring member 10 several times easily. For example, even when the vacuum suction is subsequently performed in a position a little different from that of the vacuum suction which has been previously performed, the level difference absorption member 40 can be deformed into a shape corresponding to the vacuum suction pad with which the level difference absorption member 40 has contact in the vacuum suction which is subsequently performed. For example, even when a size of the vacuum suction pad in the vacuum suction which is subsequently performed is different from that of the vacuum suction pad which has been previously performed, the level difference absorption member 40 can be deformed into a shape corresponding to the vacuum suction pad with which the level difference absorption member 40 has contact in the vacuum suction which is subsequently performed.

The level difference absorption member 40 has a thickness dimension larger than the level difference formed in the outer surface of the second sheet 34, thus can completely absorb the level difference easily.

The modulus of elasticity of the level difference absorption member 40 is smaller than that of the second sheet 34. Accordingly, the level difference absorption member 40 is elastically deformed more easily than the second sheet 34.

Embodiment 2

Figure 4:
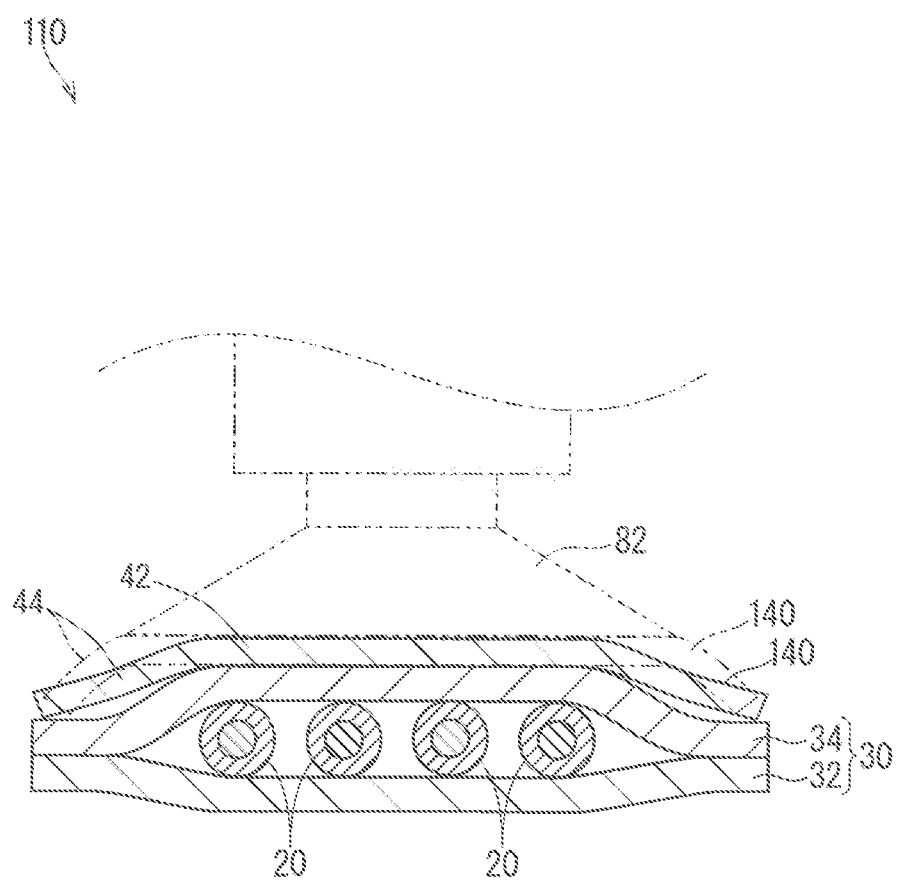
FIG. 4 is a cross-sectional view illustrating a wiring member according to an embodiment 2.

A wiring member according to an embodiment 2 is described. FIG. 4 is a cross-sectional plan view illustrating a wiring member 110 according to the embodiment 2. In the description of the present embodiment, the same reference numerals are assigned to the similar constituent elements described above, and the description thereof will be omitted.

In the present example, a level difference absorption member 140 is different from the level difference absorption member 40 described above. Specifically, the level difference absorption member 140 includes a fixing part 42 and a deformation piece 44.

The fixing part 42 is a part fixed to the second sheet 34. It is sufficient that the fixing part 42 is fixed to a portion as flat as possible in the second sheet 34. It is sufficient that the fixing part 42 is fixed to a portion of the second sheet 34 protruding to an outermost side along the thickness direction. The fixing part 42 is fixed in a state of having contact with a portion of the second sheet 34 covering the wire-like transmission member 20. A fixing state of the fixing part 42 and the second sheet 34 is not particularly limited, however, welding or bonding is also applicable.

The deformation piece 44 is a portion formed to be continuous to the fixing part 42. The deformation piece 44 is not fixed to the second sheet 34. The deformation piece 44 includes a first deformation piece. The first deformation piece is a portion formed to be continuous to the fixing part 42 in a parallel direction. In the example illustrated in FIG. 4, the first deformation piece extends to both sides of the fixing part 42, but may extends to only one side. The first deformation piece covers a portion of the second sheet 34 which does not cover the wire-like transmission member 20. In the example illustrated in FIG. 4, the first deformation piece does not protrude to outer side of an outer edge of the second sheet 34, but may protrude thereto. As illustrated in FIG. 4, the deformation piece 44 has rigidity to an extent of hanging down to a side of the second sheet 34 in accordance with a self weight in a normal state. That is to say, the deformation piece 44 has rigidity smaller than rigidity capable of maintaining a state of extending straight in a cantilever form.

The deformation piece 44 can be bended and deformed easily. Herein, the level difference absorption member 140 is formed by a sheet-like member which can be bended and deformed easily as a whole as a material. The sheet-like member can be bended and deformed more easily than the second sheet 34. In the example illustrated in FIG. 4, the thickness dimension of the sheet-like member is smaller than that of the second sheet 34, however, the thickness dimension of the sheet-like member may be equal to or larger than that of the second sheet 34. It is sufficient that an outer surface of the sheet-like member has airtightness. It is sufficient that the sheet-like member is a member with no void connected in the thickness direction such as a solid film, for example. In the example illustrated in FIG. 4, an intermediate portion of the sheet-like member in the parallel direction is fixed to the second sheet 34 to form the fixing part 42. Both end portions of the sheet-like member in the parallel direction is not fixed to the second sheet 34 but forms the deformation piece 44 (the first deformation piece).

It is sufficient that the deformation piece 44 has rigidity to an extent of not having an accordion-like shape when being vacuum-sucked, bended, and deformed. Accordingly, an occurrence of a gap between the vacuum suction pad 82 and the deformation piece 44 can be suppressed in a state where the deformation piece 44 is vacuum-sucked.

The deformation piece 44 may further include a second deformation piece. The second deformation piece is a portion formed to be continuous to the fixing part 42 in a longitudinal direction. When the deformation piece 44 includes the first deformation piece and the second deformation piece, the deformation piece 44 may further include a third deformation piece. The third deformation piece is a portion connecting the first deformation piece and the second deformation piece. When the deformation piece 44 includes the first deformation piece, the second deformation piece, and the third deformation piece, the deformation piece 44 is annularly formed around the fixing part 42.

<Motion>

When the vacuum suction is performed in a state where the vacuum suction pad 82 has contact with the fixing part 42 and there is a gap between the vacuum suction pad 82 and the deformation piece 44, the deformation piece 44 is deformed to get close to the vacuum suction pad 82. When the vacuum suction is started and the vacuum suction pad 82 has negative pressure, the deformation piece 44 is deformed to be sucked to a side of the vacuum suction pad 82 by a pressure difference.

Effect Etc. of Embodiment 2

Also according to the wiring member 110, when the outer surface of the level difference absorption member 140 is vacuum-sucked, the outer surface of the level difference absorption member 140 and the vacuum suction pad 82 are firmly attached to each other in an airtight state easily. Accordingly, the air leakage is suppressed at the time of the vacuum suction, thus the wiring member 110 is easily held by the vacuum suction.

According to the wiring member 110, the deformation piece 44 is sucked by the vacuum suction pad 82 after the vacuum suction is started, thus the outer surface of the level difference absorption member 140 and the vacuum suction pad 82 are firmly attached to each other in an airtight state easily.

Modification Example

Figure 5:
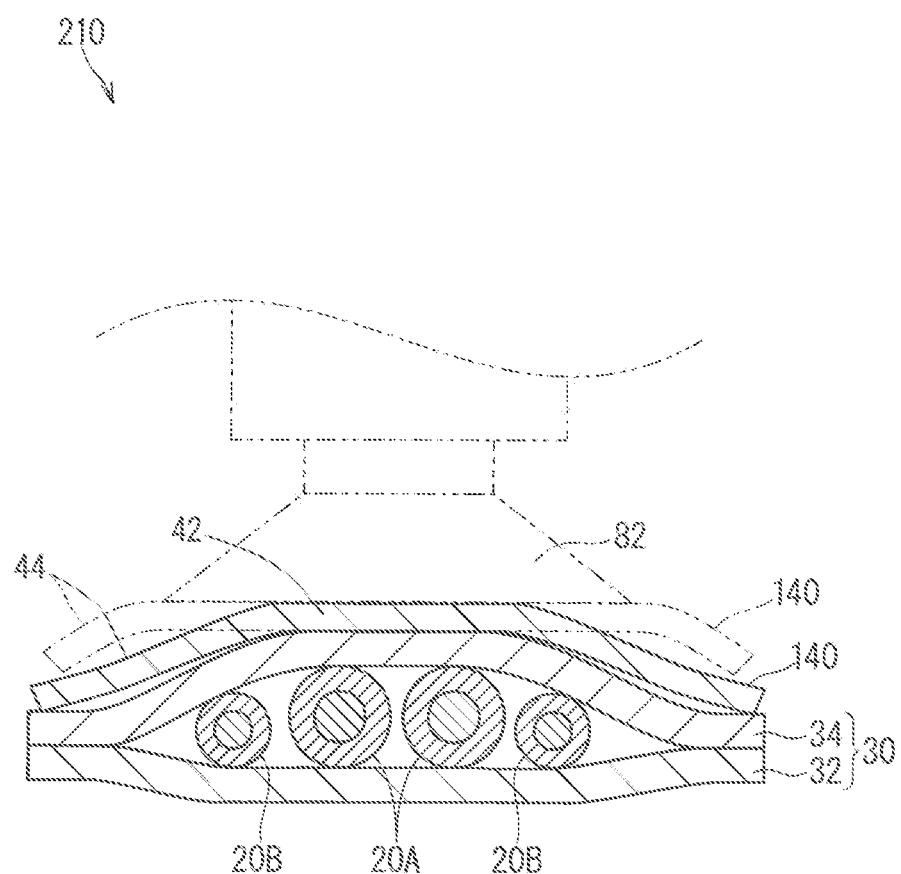
FIG. 5 is a cross-sectional view illustrating a modification example of the wiring member.

FIG. 5 is a cross-sectional view illustrating a modification example of the wiring member 110.

In a wiring member 210 illustrated in FIG. 5, the plurality of wire-like transmission members 20 include a first wire-like transmission member 20A and a second wire like transmission member 20B. The first wire-like transmission member 20A is thicker than the second wire-like transmission member 20B. The wiring member 210 includes the plurality of wire-like transmission members 20 each having a diameter different from each other.

Two first wire-like transmission members 20A are included. The number of first wire-like transmission members 20A may be one, or three or more first wire-like transmission member 20A are also applicable. Two second wire-like transmission members 20B are included. The number of second wire-like transmission members 20B may be one, or three or more second wire-like transmission member 20B are also applicable.

The first wire-like transmission member 20A is located on an inner side and the second wire-like transmission member 20B is located on an outer side along the parallel direction. It is also applicable that the second wire-like transmission member 20B is located on an inner side and the first wire-like transmission member 20A is located on an outer side along the parallel direction. The first wire-like transmission member 20A and the second wire-like transmission member 20B may be alternately located along the parallel direction.

There is a curved surface curved in a thickness direction in the outer surface of the second sheet 34. The curved surface includes a portion (referred to as a first curved surface hereinafter) generated when the first sheet 32 and the second sheet 134 get close to each other from an intermediate portion covering the wire-like transmission member 20 toward an edge portion not covering the wire-like transmission member 20 in the fixation of the first sheet 32 and the second sheet 34. The curved surface includes a portion (referred to as a second curved surface hereinafter) generated in accordance with a difference in an outer diameter between the first wire-like transmission member 20A and the second wire-like transmission member 20B. The first curved surface is located in a portion not covering the wire-like transmission member 20, and the second curved surface is located in a portion covering the wire-like transmission member 20. A level difference also occurs by the second curved surface in the second sheet 34. The level difference is a level difference generated in accordance with a difference in an outer diameter between the first wire-like transmission member 20A and the second wire-like transmission member 20B.

In the example illustrated in FIG. 5, the first curved surface and the second curved surface are continuously located without a planar surface. There may also be a case where a planar surface is located between the first curved surface and the second curved surface. For example, when the plurality of second wire-like transmission members 20B are arranged in one side portion of the sheet 30, there may be a case where a planar surface is located between the first curved surface and the second curved surface.

A position in the second sheet 34 farthest away from the first sheet 32 along the thickness direction is defined as a farthest part. In the example illustrated in FIG. 5, a portion of the second sheet 34 having contact with the first wire-like transmission member 20A is the farthest part. In the example illustrated in FIG. 5, the first curved surface and the second curved surface are located on the same side with respect to the farthest part in one side portion. That is to say, the second sheet 34 is a fixing portion fixed to the first sheet 32 via the second curved surface and the first curved surface from the farthest part. The first curved surface and the second curved surface may be located on opposite sides of the farthest part. For example, when the second wire-like transmission member 20B is located on the inner side and the first wire-like transmission member 20A is located on the outer side along the parallel direction in one side portion of the sheet 30, the first curved surface and the second curved surface may be located on opposite sides of the farthest part. It can also be considered that the first curved surface is located on the outer side of the farthest part and the second curved surface is located on the inner side of the farthest part.

The level difference absorption member 140 is fixed to the farthest part. A portion of the level difference absorption member 140 fixed to the farthest part is the fixing part 42. The level difference absorption member 140 has a portion covering the curved surface of the second sheet 34. A portion of the level difference absorption member 140 covering the curved surface is the deformation piece 44.

Also in the wiring member 10 according to the embodiment 1, the plurality of wire-like transmission members 20 may include the first wire-like transmission member 20A and the second wire-like transmission member 20B.

Moreover, in the example described above, the wire-like transmission member 20 is fixed to the first sheet 32, and the wire-like transmission member 20 is not fixed to the second sheet 34, however, this configuration is not necessary. It is also applicable that the wire-like transmission member 20 is fixed to the second sheet 34 and the wire-like transmission member 20 is not fixed to the first sheet 32. It is also applicable that the roles of the first sheet 32 and the second sheet 34 are reversed and the level difference absorption members 40 and 140 are provided on the outer side of the second sheet 34.

The configurations described in the embodiments and modification examples thereof can be appropriately combined as long as they are not contradictory.

EXPLANATION OF REFERENCE SIGNS

10, 110, 210 wiring member
12, 14 easy-bending part
20 wire-like transmission member
20A first wire-like transmission member
20B second wire-like transmission member
22 core wire
24 insulating covering
30 sheet
32 first sheet
34 second sheet
40, 140 level difference absorption member
42 fixing part
44 deformation piece
70 table
80 robot arm
82 vacuum suction pad
A region
C connector

The invention claimed is:

1. A wiring member, comprising:
a plurality of wire-like transmission members;
a sheet to which the plurality of wire-like transmission members are fixed to be arranged side by side; and
a level difference absorption member provided on an outer side of the sheet, wherein
the sheet includes a first sheet covering the plurality of wire-like transmission members from one side and a second sheet covering the plurality of wire-like transmission members from another side,
the level difference absorption member is provided on an outer side of the second sheet,
the level difference absorption member is provided to be able to absorb a level difference caused by a level difference formed in an outer surface of the second sheet when an outer surface side of the level difference absorption member is vacuum-sucked, and
the first sheet has a double-layered structure including a first layer on which the plurality of wire-like transmission members are fixed and a second layer that is a non-woven cloth.

2. The wiring member according to claim 1, wherein when the level difference absorption member is pressed by a vacuum suction pad, an outer surface of the level difference absorption member is deformed into a shape corresponding to the vacuum suction pad.

3. The wiring member according to claim 2, wherein the level difference absorption member has a thickness dimension equal to or larger than the level difference formed in the outer surface of the second sheet.

4. The wiring member according to claim 2, wherein the level difference absorption member is more easily deformed than the second sheet in the thickness direction.

5. The wiring member according to claim 2, wherein the level difference absorption member is deformable in the thickness direction.

6. A wiring member comprising:
a plurality of wire-like transmission members;
a sheet to which the plurality of wire-like transmission members are fixed to be arranged side by side; and a level difference absorption member provided on an outer side of the sheet, wherein the sheet includes a first sheet covering the plurality of wire-like transmission members from one side and a second sheet covering the plurality of wire-like transmission members from another side, the level difference absorption member is provided on an outer side of the second sheet, the level difference absorption member is provided to be able to absorb a level difference caused by a level difference formed in an outer surface of the second sheet when an outer surface side of the level difference absorption member is vacuum-sucked, the level difference absorption member includes a fixing part fixed to the second sheet and a deformation piece formed to be continuous to the fixing part and not fixed to the second sheet, and when a vacuum suction starts in a state where a vacuum suction pad has contact with the fixing part and there is a gap between the vacuum suction pad and the deformation piece, the deformation piece is deformed to get close to the vacuum suction pad.

7. A wiring member comprising:

a plurality of wire-like transmission members;

a sheet to which the plurality of wire-like transmission members are fixed to be arranged side by side; and a level difference absorption member provided on an outer side of the sheet, wherein the sheet includes a first sheet covering the plurality of wire-like transmission members from one side and a second sheet covering the plurality of wire-like transmission members from another side, the level difference absorption member is provided on an outer side of the second sheet, the level difference absorption member is provided to be able to absorb a level difference caused by a level difference formed in an outer surface of the second sheet when an outer surface side of the level difference absorption member is vacuum-sucked, and a modulus of elasticity of the level difference absorption member is smaller than a modulus of elasticity of the second sheet.

* * * * *